United States Patent [19]

Mizuno et al.

[11] Patent Number: 5,204,290
[45] Date of Patent: Apr. 20, 1993

[54] CRYSTALLIZED GLASS

[75] Inventors: Yasuo Mizuno; Masaki Ikeda, both of Hirakata, Japan

[73] Assignee: Matsushita Electric Industrial Co., Ltd., Osaka, Japan

[21] Appl. No.: 809,750

[22] Filed: Dec. 18, 1991

[30] Foreign Application Priority Data

Dec. 18, 1990 [JP] Japan .................. 2-403074

[51] Int. Cl.⁵ .................. C03C 8/10; C03C 10/00
[52] U.S. Cl. .................. 501/14; 501/4; 501/5; 501/10; 501/22; 501/76
[58] Field of Search .................. 501/4, 5, 10, 14, 22, 501/76, 15, 23

[56] References Cited

U.S. PATENT DOCUMENTS

| | | | |
|---|---|---|---|
| 3,947,279 | 3/1976 | Hudecek | 501/76 X |
| 4,816,949 | 3/1989 | Yamada et al. | 501/76 X |
| 4,855,261 | 9/1989 | Mizuno et al. | 501/76 |
| 4,966,926 | 10/1990 | Donohue | 501/11 X |
| 5,079,193 | 1/1992 | Donohue | 501/76 X |
| 5,114,885 | 5/1992 | Hormadaly | 501/76 |

FOREIGN PATENT DOCUMENTS 4822976 7/1973 Japan.

Primary Examiner—Karl Group
Attorney, Agent, or Firm—Ratner & Prestia

[57] ABSTRACT

The invention relates to crystallized glass that can be used with various electronic components such as magnetic heads and the like as bonding or sealing glass. This crystallized glass comprises, in % by weight, at least 11–17% of $SiO_2$, 7–10% of $B_2O_3$, 30–55% of PbO, 1–3% of CdO, 5–10% of $A_2O$ (A stands for a kind of alkali metal), 7–35% of ZnO and 0–10% of $ZrO_2$ with the sum of ZnO and $ZrO_2$ not exceeding 35%, and has the characteristics of 550°–600° C. as the working temperature, $(80-100) \times 10^{-7}/°C$. as the thermal expansion coefficient, 550° C. or more as the thermal expansion coefficient, and 550° C. or more as the glass transition point after working.

5 Claims, 1 Drawing Sheet

CRYSTALLIZED GLASS

BACKGROUND OF THE INVENTION

1. Field of the Invention

This invention relates to a crystallized glass for use in electronic components such as magnetic heads and the like.

2. Description of Prior Art

In recent years as electronic technology has progressed, demands for various kinds of glass have been increasing. Glass for magnetic head applications according to the conventional technology will be explained in the following:

FIG. 1 shows a typical construction of video tape recorder magnetic heads which use nonmagnetic substrates of ceramics.

Over the nonmagnetic substrate 1, a magnetic substance and $SiO_2$ are laminated alternatively, forming a track section 2. The track section 2 is bonded to the nonmagnetic substrate 3 by crystallized glass 4. Two units of this set-up are put together forming a gap. The aperture of this gap is filled with gap glass 5.

In addition, the two units are bonded together by amorphous sealing glass. Coils are wound around a specified place of the structure. With the magnetic head thus constructed, the crystallized glass 4 must be crystalized sufficiently to prevent it from softening when bonding of the amorphous sealing glass 6 is taking place.

Amorphous alloys have been used so far as the magnetic substance. In this case, the working temperature of the crystallized glass 4 and the amorphous glass 6 is 480° C. so as not to deteriorate the magnetic characteristics of the amorphous alloys.

Recently, however, corresponding to the magnetic recording media of high coercive force, superstructured nitride alloys composed of Co-Nb-Zr-Ta-N system or Fe-Nb-(Si-B)-N system (See, for example, the technical study reports MR-86-4, 87-14 and 88-55 of Institute of Electronics, Information and Communication Engineers of Japan) have been developed as the magnetic substance.

In these substances, a working temperature of 550°-600° C. is considered best so as to prevent deterioration of the magnetic performance of superstructured nitride alloys. In addition, the thermal expansion coefficient $\alpha$ of the magnetic substance is $(100-110) \times 10^{-7}/°C$.

Therefore, the working temperature of the required crystallized glass should be 550°-600° C. and the glass transition point which gives a yardstick to the maximum operating temperature after crystallization (after working) should be 550° C. or more.

Also, the thermal expansion coefficient $\alpha$ of the crystallized glass should be a little bit smaller than that of the magnetic substance in order to create a compressive stress with the glass after its crystallization. Thus, $\alpha$ is preferably $(80-100) \times 10^{-7}/°C$.

Accordingly, a first example which achieved a performance close to the above, as described in Japanese Patent Publication Sho 48-22976/73, discloses a crystalized glass with a thermal expansion coefficient $\alpha$ of $(93-95) \times 10^{-7}/°C$. and a working temperature of 510°-530° C. under the amorphous state, and $\alpha$ of $(80-82) \times 10^{-7}/°C$. after working at a temperature of $510° \approx 530°$ C.

Also, a second example, which relates to commercially available crystallized glass, as in Corning Glass Work's products, shows $\alpha$ of $65.4 \times 10^{-7}/°C$. and a working temperature of 525° C. for Corning product number 7578. This product has a maximum operating temperature of 460° C. after working. In other words, after working at 525° C., product number 7578 crystallizes, and, once it crystallizes, it does not change its shape until the temperature becomes higher than 460° C. In addition, an $\alpha$ of $47.6 \times 10^{-7}/°C$. and a working temperature 580° C. is obtained for Corning product number 7594.

A third example, as disclosed in U.S. Pat. No. 4,966,926 shows a crystallized glass of a $SiO_2$-$B_2O_3$-$PbO$-$ZnO$ system which forms a crystal structure of $Zn_2SiO_4$ and $ZnB_2O_4$ at a firing temperature of 650°-800° C.

However, the above examples of glass have not been satisfactory in the following points:

The thermal expansion coefficient $\alpha$ is sufficient but the working temperature is too low as in the case of the above first example.

The working temperature is 500° C. or more but $\alpha$ is too small and the maximum operating temperature is lower than 550° C. after working as in the case of the above second example.

The crystallization requires heating at a temperature as high as 650°-800° C., as in the case of the above third example. This heating temperature does not comply with the working temperature requirement of 550°-600° C. as specified by this invention.

SUMMARY OF THE INVENTION

Therefore, it is an object of this invention to provide new crystallized glass which satisfies the requirements as described above, including a desirable working temperature, thermal expansion coefficient and the like, namely, a working temperature of 550°-600° C., a glass transition point of 550° C. or more after working and a thermal expansion coefficient $\alpha$ of $(80-100) \times 10^{-7}$.

In order to achieve the above objective, the crystallized glass of this invention comprises at least the following ingredients in the specified % by weight:

$SiO_2 = 11-17\%$
$B_2O_3 = 7-10\%$
$PbO = 30-55\%$
$CdO = 1-3\%$
$A_2O = 5-10\%$ ("A" stands for an alkali metal, such as sodium and potassium)
$ZnO = 7-35\%$
$ZrO_2 = 0-10\%$ where the sum of ZnO and $ZrO_2$ should not exceed 35%. $SiO_2$ tends to make the glass increase its chemical durability and improve its adhering strength.

However, when the amount of $SiO_2$ is less than 11%, the working temperature becomes lower than 550° C. and when the amount of $SiO_2$ is more than 17%, the thermal expansion coefficient $\alpha$ becomes too small, making the resultant glass less acceptable.

$B_2O_3$ is needed to lower the working temperature. With a $B_2O_3$ content of less than 7%, the working temperature exceeds 600° C., and if the $B_2O_3$ content is more than 10%, $\alpha$ becomes too small to make suitable glass.

PbO provides glass with fluidity. With a PbO content of less than 30%, the working temperature exceeds 600° C. and with a PbO content of more than 55% $\alpha$ becomes too much for acceptable glass.

CdO is an important ingredient to lower the working temperature. With a CdO content of less than 1%, the working temperature becomes higher than 600° C. and with a CdO content of more than 3%, crystallization becomes too difficult to make acceptable glass.

$A_2O$ (A stands for alkali metals) is indispensable for lowering the working temperature and for larger $\alpha$. With an $A_2O$ content of less than 5%, the working temperature becomes higher than 600° C. and with an $A_2O$ content of more than 10%, $\alpha$ becomes too big for desired glass.

ZnO works in crystallization of glass. With a ZnO content of less than 7%, crystallization becomes difficult and with a ZnO content of more than 35%, $\alpha$ becomes too small for acceptable glass.

$ZrO_2$ facilitates crystallization of glass. If the $ZrO_2$ content exceeds 10%, glass formation producing acceptable glass becomes difficult to achieve.

When the sum of ZnO and $ZrO_2$ content exceeds 35%, it becomes difficult for glass formation to take place, making the whole process unacceptable.

Therefore, the composition of the crystallized glass that satisfies the previously stated requirements in property is desirably the composition as described above.

In addition, for purposes of bubble elimination, the addition of some $As_2O_3$ or $Sb_2O_3$ to the composition of the crystallized glass as described above is allowed as long as it does not influence the effects of this invention adversely.

Also allowed is the addition of some other ingredients which are well known in the industry. Again, these products are allowed as long as they do not adversely affect this invention.

DESCRIPTION OF THE PREFERRED EMBODIMENTS

Figure 1:
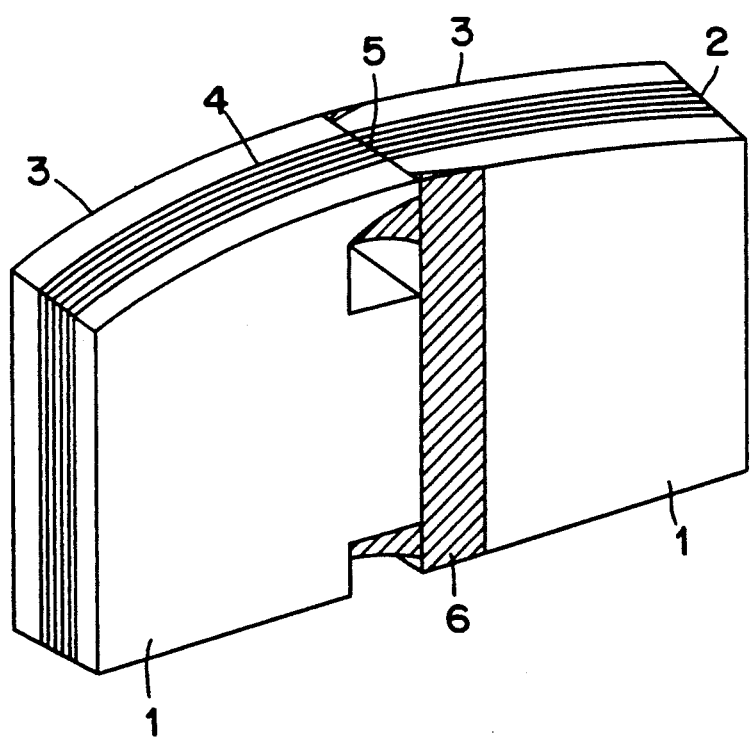
FIG. 1 is a perspective view of a typical magnetic head for video tape recorders.

A detailed explanation of this invention of crystallized glass will be made as follows by means of one example:

First, as the raw materials of the crystallized glass, $SiO_2$, $H_3BO_3$, $Pb_3O_4$, ZnO, CdO, $K_2CO_3$, $Na_2CO_3$, $Li_3CO_3$ and $ZrO_2$ are collected. Then, these raw materials are weighed and mixed according to the composition specification as described in Table 1. The compounds are then heated to a molten state at 1000°–1200° C. for 20–30 minutes. This product of melting is either thrown into water or cooled down quickly by a twin-roller and then crushed to produce powders of amorphous glass. With regard to glass samples of various compositions, the thermal expansion coefficient $\alpha$, the glass transition point (Tg) and the yielding point (At) are obtained as listed in Table 1 from the thermal expansion curves. In these tests, the samples No. 1–No. 9 used Potassium (K), the sample 10 used Sodium (Na) and the sample 11 used Lithium (Li) as the alkali metals.

TABLE 1

| No. | 1 | 2 | 3 | 4 | 5 | 6 | 7 |
|---|---|---|---|---|---|---|---|
| Composition (wt %) | | | | | | | |
| $SiO_2$ | 12.1 | 12.1 | 12.1 | 16.6 | 16.6 | 16.6 | 12.1 |
| $B_2O_3$ | 9.1 | 9.1 | 9.1 | 7.7 | 7.7 | 7.7 | 9.1 |
| PbO | 52.3 | 47.8 | 40.7 | 46.0 | 38.8 | 31.7 | 52.3 |
| ZnO | 19.1 | 23.6 | 30.7 | 19.2 | 26.4 | 33.5 | 15.0 |
| CdO | 1.4 | 1.4 | 1.4 | 2.0 | 2.0 | 2.0 | 1.4 |
| $K_2O$ | 6.0 | 6.0 | 6.0 | 8.5 | 8.5 | 8.5 | 6.0 |
| $ZrO_2$ | | | | | | | 4.1 |
| $Na_2O$ | | | | | | | |
| $Li_2O$ | | | | | | | |
| Glass State | Amorphous | 550° C. after 30 min. | Amorphous | 550° C. after 30 min. | Amorphous | 600° C. after 30 min. | Amorphous | 550° C. after 30 min. | Amorphous | 600° C. after 30 min. | Amorphous | 600° C. after 30 min. | Amorphous | 550° C. after 30 min. |
| Characteristics | | | | | | | |
| $\alpha$ (× $10^{-7}$/°C.) | 96 | 90 | 91 | 83 | 83 | 82 | 101 | 96 | 93 | 88 | 84 | 81 | 94 | 89 |
| Tg (°C.) | 397 | 576 | 406 | 592 | 417 | 619 | 404 | 616 | 422 | 654 | 438 | 688 | 407 | 586 |
| At (°C.) | 437 | 636 | 447 | 640 | 458 | 669 | 447 | 644 | 468 | 684 | 486 | 718 | 447 | 646 |

| No. | 8 | 9 | 10 | 11 |
|---|---|---|---|---|
| Composition (wt %) | | | | |
| $SiO_2$ | 12.1 | 12.1 | 12.1 | 12.1 |
| $B_2O_3$ | 9.1 | 9.1 | 9.1 | 9.1 |
| PbO | 52.3 | 52.3 | 52.3 | 52.3 |
| ZnO | 11.8 | 9.1 | 15.0 | 15.0 |
| CdO | 1.4 | 1.4 | 1.4 | 1.4 |
| $K_2O$ | 6.0 | 6.0 | | |
| $ZrO_2$ | 7.3 | 10.0 | 4.1 | 4.1 |
| $Na_2O$ | | | 6.0 | |
| $Li_2O$ | | | | 6.0 |
| Glass State | Amorphous | 600° C. after 30 min. | Amorphous | 600° C. after 30 min. | Amorphous | 550° C. after 30 min. | Amorphous | 550° C. after 30 min. |
| Characteristics | | | | |
| $\alpha$ (× $10^{-7}$/°C.) | 89 | 84 | 83 | 81 | 96 | 91 | 100 | 94 |

TABLE 1-continued

| | | | | | | | | |
|---|---|---|---|---|---|---|---|---|
| Tg (°C.) | 416 | 602 | 428 | 628 | 400 | 580 | 395 | 575 |
| At (°C.) | 458 | 660 | 469 | 688 | 440 | 641 | 435 | 634 |

As clearly seem from Table 1, the samples No. 1–No. 11 which have the compositions as described in this invention satisfy the characteristics of the glass transition point Tg to be 550° C. or more and the thermal expansion coefficient $\alpha$ to be $(80-100) \times 10^{-7}/°C.$ under the working temperature of 550°–600° C. The glass transition point Tg provides a measure of the maximum operating temperature after working.

Especially, the sample composition as shown in Table 1, namely, 12.1–16.6% by weight of $SiO_2$, 7.7–9.1% by weight of $B_2O_3$, 31.7–52.3% by weight of PbO, 1.4–2.0% by weight of CdO, 6.0–8.5% by weight of $A_2O$, where A is an alkali metal, 9.1–33.5% by weight of ZnO and 0–10% by weight of $ZrO_2$ with the condition that the sum of ZnO and $ZrO_2$ should not exceed 33.5% by weight, has a glass transition point of 575° C. or more after working and a thermal expansion coefficient $\alpha$ of $(81-96) \times 10^{-7}/°C.$, producing crystallized glass of desirable characteristics.

In comparison with the glass of this invention, an investigation was conducted on the crystallized glass as disclosed in the previously described first example to find out about its thermal expansion coefficient $\alpha$, glass transition point Tg and yielding point At. The results of the investigation together with the glass compositions are shown in Table 2.

TABLE 2

| Sample No. | 12 | | 13 | | 14 | |
|---|---|---|---|---|---|---|
| Composition (wt %) | | | | | | |
| $SiO_2$ | 2.0 | | 1.5 | | 2.5 | |
| $B_2O_3$ | 9.5 | | 9.0 | | 10.0 | |
| PbO | 70.5 | | 70.0 | | 69.5 | |
| ZnO | 16.0 | | 17.0 | | 15.5 | |
| $SnO_2$ | 2.0 | | 2.5 | | 2.5 | |
| Glass State | Amorphous | 520° C. after 30 min. | Amorphous | 510° C. after 30 min. | Amorphous | 530° C. after 30 min. |
| Characteristics | | | | | | |
| $\alpha (\times 10^{-7}/°C.)$ | 94 | 81 | 95 | 82 | 93 | 80 |
| Tg (°C.) | 345 | 538 | 350 | 543 | 350 | 544 |
| At (°C.) | 370 | 598 | 375 | 603 | 378 | 604 |

As clearly indicated in Table 2, every kind of crystallized glass of the compositions disclosed in the first example shows a glass transition point Tg lower than 550° C. and does not meet the Tg of 550° C. or more as required by this invention.

Concerning the crystallized glass of the previously explained first and second examples, it was already discussed that the glass of the previously described second example has a thermal expansion coefficient $\alpha$ of much smaller than $80 \times 10^{-7}/°C.$ In addition, the glass of the previously described third example is desirably heated to a temperature higher than 650° C., clearly failing in falling within the range of 550° $\approx$ 600° C. as the working temperature. So these kinds of glass do not satisfy the characteristics as required by this invention.

Now, as one example of the applications of the invented crystallized glass, the case where the crystallized glass of this invention using the sample No. 1 of Table 1 is used as the crystallized glass 4 of the magnetic head illustrated in FIG. 1 will be presented in the following:

First, over the non-magnetic substrate 1 made from a $MgO$-$TiO_2$-NiO ceramics, a magnetic substance composed of a Co-Nb-Zr-Ta system superstructured nitride alloy and $SiO_2$ are placed in alternate layers to form the track section 2 of 26 $\mu$m width. After depositing the crystallized glass powder of this invention over the non-magnetic substrate 3 to 4 $\mu$m thickness, the non-magnetic substrate 3 of the non-magnetic substrate 1 with the track section 2 formed on it are heated at 550° C. for 30 minutes and bonded together. The gap glass 5 is formed by sputtering a quartz glass to 0.3 $\mu$m thickness. In an exemplary embodiment of the present invention, Corning Glass Works product 1417 is used by heating it at 550° C. for 30 minutes as the amorphous sealing glass 6.

The magnetic head thus produced does not show any looseness or displacement at the place where the crystallized glass of this invention is applied as a jointing means.

In order to obtain a comparison of the effectiveness of the crystallized glass of this invention with a conventional crystallized glass, a glass of the composition sample No. 12 of Table 2 may be used in place of the crystallized glass of this invention to build a magnetic head by the same method as described above. An observation of the place of the magnetic head where the conventional crystalized glass is applied as a jointing means shows a displacement of 5 $\mu$m.

The cause of this displacement is a softening of the crystallized glass when the amorphous sealing glass 6 is applied since the glass transition point of the crystallized glass is 538° C. This kind of displacement causes an irregular thickness to the magnetic head or a surface level difference created between the track section 2 and the non magnetic substrate 3, obviously leading to process failures.

Thus, when the crystallized glass of this invention is used with a magnetic head, a high precision magnetic head without any dangers of the above displacement and looseness will be produced. Moreover, the crystallized glass of this invention can be utilized not only by magnetic heads, but also in the following areas:

Sealing of metals, the thermal expansion coefficients of which are close with each other, (such as platinum, titanium, chrome iron alloy, 426 alloy and the like)

Sealing of the various kinds of glass, the thermal expansion coefficients of which are close with each other (such as soda-lime glass, lead potassium glass, borosilicate glass and the like)

Bonding of cathode ray tubes.

Other applications such as IC (Integrated Circuit) packaging, hermetic sealing, seath heater and the like.

What is claimed:

1. A crystallized glass comprising at least as ingredients, in % by weight,
11–17% of $SiO_2$, 7–10% of $B_2O_3$, 30–55% of PbO, 1–3% of CdO, 5–10% of $A_2O$ where A is an alkali metal, 7–35% of ZnO and 0–10% of $ZrO_2$ wherein the sum of the amounts of ZnO and $ZrO_2$ do not exceed 35%.

2. A crystallized glass according to claim 1, wherein the ingredient contents are, in % by weight, 12.1–16.6% of $SiO_2$ 7.7–9.1% of $B_2O_3$, 31.7–52.3% of PbO, 1.4–2.0% of CdO, 6.0–8.5% of $A_2O$ of A is an alkali metal, 9.1–33.5% of ZnO and 0.10% of $ZrO_2$ wherein the sum of the amounts of ZnO and $ZrO_2$ do not exceed 33.5%.

3. A crystallized glass according to claim 1, wherein the working temperature of the glass is 550° to 600° C.

4. A crystallized glass according to claim 1, wherein the transition point of the crystallized glass is 550° C. or more.

5. A crystalized glass according to claim 1, wherein the expansion coefficient of the crystallized glass is $(80-100) \times 10^{-7}/°C$.

* * * * *